United States Patent [19]

Guertin

[11] 4,114,593
[45] Sep. 19, 1978

[54] SOLAR HEATING SYSTEM

[76] Inventor: Emile Guertin, Wheeler Rd., Marstons Mills, Mass. 02648

[21] Appl. No.: 660,505

[22] Filed: Feb. 23, 1976

[51] Int. Cl.² ............................................. F24J 3/02
[52] U.S. Cl. .................................. 126/270; 165/170; 165/185
[58] Field of Search ................ 126/270, 271; 165/170, 165/185, 182

[56] References Cited

U.S. PATENT DOCUMENTS

| | | | |
|---|---|---|---|
| 842,658 | 1/1907 | Haskell | 126/271 |
| 1,549,619 | 8/1925 | Steenstrup | 165/170 |
| 1,816,437 | 7/1931 | Laird et al. | 165/166 |
| 2,519,281 | 8/1950 | Presser et al. | 126/271 |
| 2,810,849 | 10/1957 | Agule | 165/185 |
| 3,902,474 | 9/1975 | Pyle | 126/271 |
| 3,946,720 | 3/1976 | Keyes et al. | 126/270 |
| 3,996,919 | 12/1976 | Hepp | 126/270 |
| 4,019,494 | 4/1977 | Safdari | 126/270 |
| 4,033,324 | 7/1977 | Eckels | 126/271 |

FOREIGN PATENT DOCUMENTS 621,392  1/1926  France ...................... 126/271

Primary Examiner—Carroll B. Dority, Jr.
Attorney, Agent, or Firm—Wolf, Greenfield & Sacks

[57] ABSTRACT

The system produces heated air at a temperature up to 230° F. and comprises a box structure having one or more glass panels covering the top of the box. Separator walls divide the box into a series of air conveying ducts with the air being forced by means of a blower through the ducts in a serpentine fashion. A heat conductive plate covers the separator walls and is painted black so as to absorb the sun's rays passing through the glass panels. A plurality of dissipators which each comprise a number of heat conductive dissipator plates, are secured to the main conductive plate and each extend into their respective duct. The main conductive plate and dissipator plates are all arranged parallel to each other and the box is situated so that the main conductive plate is perpendicular to the sun's rays.

9 Claims, 4 Drawing Figures

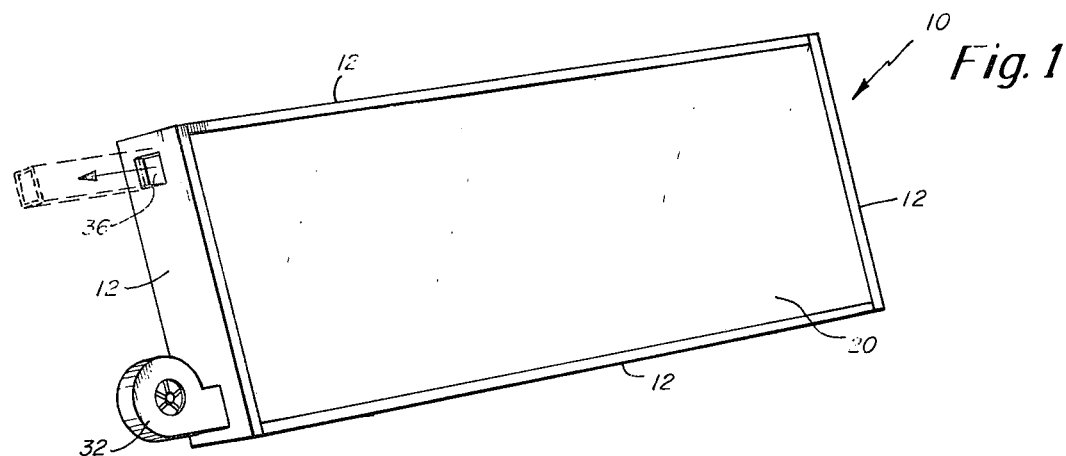
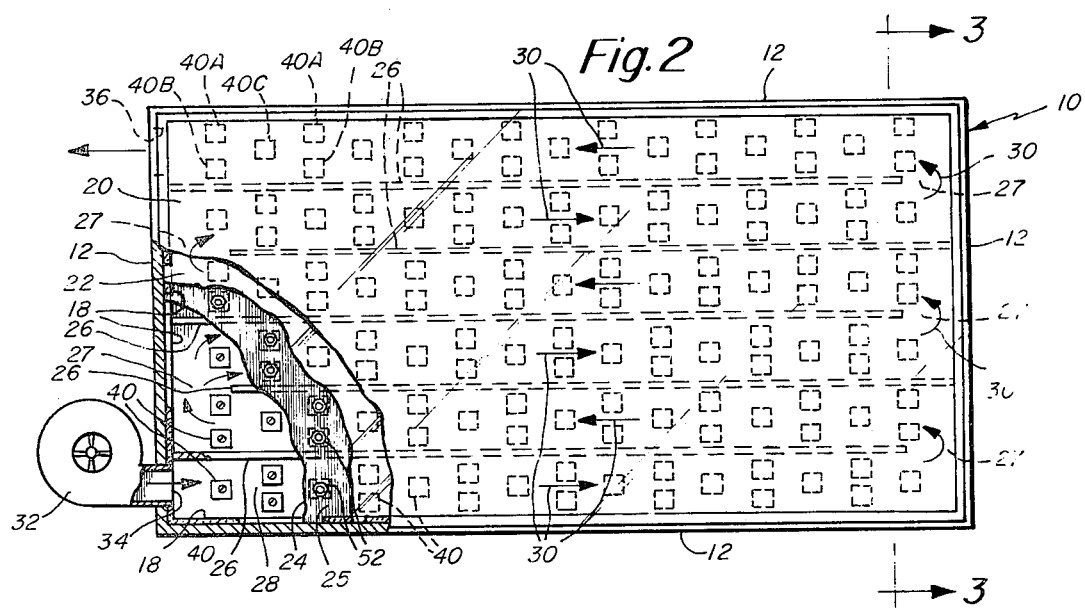
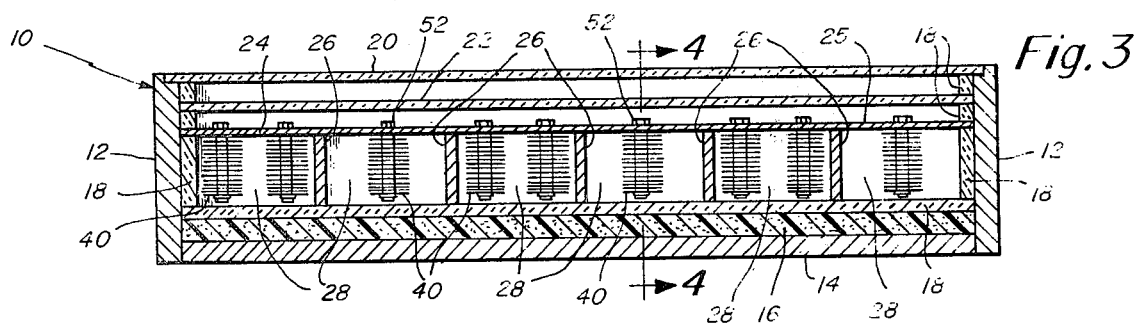
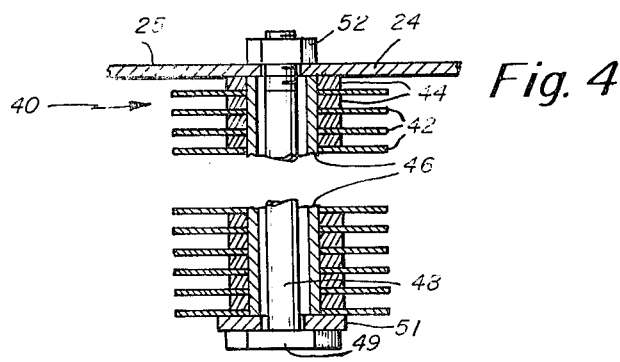

SOLAR HEATING SYSTEM

BACKGROUND OF THE INVENTION

The present invention relates in general to a solar heating system and is concerned, more particularly, with a solar heating system of the forced air type.

There are various types of solar heating systems that are shown in the prior art patents. For example, see U.S. Pat. Nos. 3,102,532, 2,677,243 and 2,566,327. These systems do provide limited heat but are generally inefficient.

Accordingly, one object of the present invention is to provide an improved solar heating system and one which is of the forced air type.

Another object of the present invention is to provide a solar heating system wherein temperatures as high as 230° F. are obtainable.

A further object of the present invention is to provide a solar heating system wherein the output temperatures can be maintained at any one of a number of different desired operating temperatures.

Still another object of the present invention is to provide a solar heating system that is relatively simple in construction, is easy to maintain, and which is operable for an extremely long period of time.

SUMMARY OF THE INVENTION

To accomplish the foregoing and other objects of this invention there is provided a solar heating system which comprises a box structure having a bottom wall and a plurality of side walls. Heat insulating means lines the inside of the box structure and is for assisting and maintaining the heat in the box structure. One or two transparent glass panels cover the box structure and the system is arranged so that the sun's rays are directed through the transparent panels to the inside of the box structure. A plurality of separator walls are spacedly disposed in the structure and these walls define a serpentine duct comprised of a series of linear duct sections. The separator walls support a heat conductive plate which also forms a part of each duct section. A number of heat dissipators are mounted to the heat conductive plate with each dissipator extending into its respective duct section. There may be 20 or more dissipators in each duct section. Each dissipator may comprise a plurality of heat conductive plates spacedly disposed with each of the plates maintained in parallel to the main heat conductive plate from which the dissipators are mounted. A blower means is disposed at one end of one duct section and in the disclosed embodiment this blower means is mounted outside of the box structure. The output of the blower extending into one of the duct sections for forcing air through the serpentine duct. At the other end of the duct there is provided an exit means which may simply be a passageway in the box structure from which the heated air escapes. As the air is blown through the duct sections the air is heated by virtue of the air passing around the dissipators. The sun's rays heat the heat conductive plate and this heat is quickly conveyed to each of the heat dissipators.

Various arrangements have been experimented with and it has been found that the best results are obtained when the heat conductive plate is maintained perpendicular to the sun's rays. Also, the smaller plates comprising the dissipators are also preferably parallel to the main heat conductive plate. Also, it has been found that improved heat transfer occurs by essentially staggering the dissipators in any one duct section. In a preferred embodiment at one point in the duct section two dissipators are disposed side by side. The next dissipator in a duct is a single dissipator disposed in the middle of the duct. Thereafter, another pair of dissipators are arranged in a side by side fashion and this order of the dissipators continues throughout each duct section.

BRIEF DESCRIPTION OF THE DRAWINGS

Numerous other objects, features and advantages of the invention should now become apparent upon a reading of the following detailed description taken in conjunction with the accompanying drawings, in which:

FIG. 1 is a perspective view showing the solar heating system of this invention;

FIG. 2 is a top view of the system partially in cross section;

FIG. 3 is a cross sectional view taken along line 3—3 of FIG. 2; and

FIG. 4 is a cross sectional view taken along line 4—4 of FIG. 3.

DETAILED DESCRIPTION

Referring now to the drawings, there is shown a box structure 10 which comprises four side walls 12 and a bottom wall 14. This box structure may be constructed from many different types of materials and may even be constructed from wood. The material of the walls 12 and 14 is preferably a heat insulating material. The box structure may have a size of 4 ft. ✕. 8 ft. ✕ 1 ft., for example.

The inside of the box structure is preferably lined with an insulating material. An insulating base 16 may be used. This base may be constructed of 1 inch thick Styrofoam (a trademark of the Dow Chemical Company for expanded, cellular polystyrene). In addition, the box structure may be lined with further heat insulating material in the form of a Celotex board 18 (Celotex is a trademark of The Celotex Corporation and is a structural building and insulating board made from wood fibers and treated to be resistant to fungi, termites and water penetration). The side walls 12 are also lined with this Celotex board 18 as shown in FIG. 3.

The box structure is closed at its top by glass panels 20 and 22 which are disposed parallel to each other. These panels are preferably made of a transparent glass. The panel 20 may rest in a top notch of the wall 12 and pieces of the board 18 may be used as spacers for supporting the panels 20 and 22 as shown in FIG. 3. A heat conductive board 24 is disposed parallel to the panels 20 and 22 and may also be supported at its outer edges by means of the board 18. However, the primary support for the heat conductive plate 24 comprises the separator walls 26, each of which may be constructed of wood and each of which is fastened by suitable means at its top end to the heat conductive plate 24. The plate 24 may have holes drilled therein for accommodating screws for fastening the separator walls 26 to the plate 24. The plate 24 may be made of copper and preferably has a black cover over its top surface 25. The copper plate may be sprayed with a black paint, for example. In fact, even both sides of the plate 24 may be sprayed with the black paint.

It is noted that each of the separator walls 26 commence at an edge of the box structure but terminate short of the opposite edge to form an opening such as opening 27 shown in FIG. 2. In this way the separator walls in combination with the board 18 and the plate 24 define a serpentine duct including duct sections 28 which are interconnected one to the next in a zig-zag fashion as most clearly shown in FIG. 2. The arrows 30 of FIG. 2 show the direction of travel of air through the duct system. The air is circulated by means of a standard blower motor 32 which has its output port 34 coupled through one of the walls 12 of the box structure. FIG. 2 shows the blower motor 32 forcing air through a first one of the duct sections. From there the forced air blows in the direction of the arrows 30 to an exit port 36 which happens to be in the same wall 12 as is the blower motor 32.

The forced air is heated not only by virtue of its contact with the heat conductive plate 24 but also by passing around and about the heat dissipators 40. FIG. 4 shows a detail of one of these heat dissipators and FIG. 2 shows the general layout of the heat dissipators. There are twenty-two or twenty-three of these heat dissipators in each of the duct sections 28. Each of the heat dissipators comprises a plurality of relatively thin plates 42, each of which is separated from its adjacent plate by means of a spacer 44. The plates 42 and their associated spaces 44 are stacked about a support sleeve 46. The plates 42 and the sleeve 46 are both constructed of a conductive material which is preferably metal. The dissipator is supported by means of a bolt 48 which passes through the sleeve 46. The head 49 of the bolt is tightened against a washer 51 and the other end of the bolt receives a nut 52 for securing the entire dissipator together. In an alternate embodiment the spacers 44 may be removed in which case the plates 42 essentially abut each other. The aperture in the plates 42 are of a size so that the plates 42 fit snugly onto the sleeve 46 thus providing good conductive contact from the plate 24 via the sleeve 46 to the plates 42.

The solar system of this invention is preferably disposed so that the sun's rays are directed perpendicular to the box structure and more particularly perpendicular to the heat conductive plate 24. Preferably, also the plates 42 are disposed perpendicular to the sun's rays or in other words parallel to the heat conductive plate 24. The plate 24 with its black covering will absorb heat rather rapidly and this heat is transferred to the heat dissipators 40. When the forced air has passed through all six duct sections the air may be heated to a temperature of even as high as 230° F. The blower motor 32 may have its speed controlled so as to in turn control the output temperature from the output port 36. A temperature control may also be associated with the system to periodically interrupt operation of the blower 32.

Another feature of the present invention is the particular placement of these dissipators 40. It has been found that good heat transfer occurs when the dissipators are in the pattern shown in FIG. 2. Thus, the dissipators 40A and 40B indicated in the upper left hand corner of FIG. 2 are in a side by side arrangement. The next dissipator 40C is a single dissipator that is essentially in line with the space between the dissipators 40A and 40B. Thereafter there are two other dissipators 40A, 40B in the side by side arrangement. This pattern continues throughout each of the duct sections as is clearly illustrated in FIG. 2.

What is claimed is:

1. A solar heating system comprising;
 a box means having a bottom wall and a plurality of side walls and including insulating means in the box means for holding generated heat inside the box means,
 at least one translucent panel covering the box means and positioned to receive rays from the sun,
 a heat-conductive plate disposed in the box means,
 separate walls in the box means for at least partially supporting the heat-conductive plate and defining a serpentine duct comprised of a series of interconnected duct sections,
 a plurality of heat dissipators wherein each heat dissipator comprises a plurality of dissipator plates,
 means for mounting the heat dissipators to the heat-conductive plate with a series of the dissipators extending along each duct section,
 wherein said means for mounting mounts the dissipator plates in parallel to each other and in parallel to the heat-conductive plate,
 blower means coupled to the duct for forcing air therethrough,
 and exit means from the duct from which the heated air departs,
 said means for mounting comprising a heat-conductive sleeve, and a plurality of conductive spacers disposed between the dissipator plates for suitably spacing the dissipator plates one from the next.

2. A solar heating system comprising; a box means having a bottom wall and a plurality of side walls and including heat insulating means in the box means for maintaining heat inside the box, translucent panel means enclosing the box means, a heat conductive plate disposed in the box means, separate walls in the box means defining a duct comprised of a series of interconnected duct sections, a plurality of heat dissipators each comprising a plurality of dissipator plates and means supporting the dissipator plates in spaced side-by-side relationship, means for mounting the heat dissipators to the heat-conductive plate with a group of the dissipators extending along each duct section, blower means coupled to the duct for forcing air therethrough, and exit means from the duct from which the heated air departs, said means for supporting the dissipator plates comprising a plurality of heat conductive spacers for spacing the dissipator plates from each other and a heat conductive sleeve having the spacers and dissipator plates extending thereabout, said means for mounting including a bolt means passing through the sleeve for securing all spacers and dissipator plates end fastening the sleeve to the conductive plate.

3. A solar heating system as set forth in claim 2 wherein said separator walls are for at least partially supporting the heat-conductive plate.

4. A solar heating system as set forth in claim 2 wherein said heat dissipators each have a free end terminating in the duct.

5. A solar heating system as set forth in claim 2 wherein said spacers and dissipators have a central aperture of a diameter substantially the same as the outer diameter of the sleeve.

6. A solar heating system as set forth in claim 5 including a washer about the bolt having an outer diameter larger than the diameter of the sleeve.

7. A solar heating system as set forth in claim 6 wherein the combined thicknesses of the dissipator plates and spacers is substantially the same as the length of the sleeve.

8. A solar heating system comprising;
 a box means having a bottom wall and a plurality of side walls and including heat insulating means in the box means for maintaining heat inside the box means, translucent panel means enclosing the box means, a heat conductive plate disposed in the box means, a plurality of heat dissipators each comprising a plurality of dissipator plates, a plurality of spacers interleaved with the dissipator plates to space the dissipator plates and a sleeve having the spacers and dissipator plates extending thereabout, bolt means for mounting the heat dissipators to the heatconductive plate, blower means coupled to the duct for forcing air therethrough, and exit means from the duct from which the heated air departs.

9. A solar heating system as set forth in claim 8 including a washer about the bolt for securing the sleeve in place to the heat-conductive plate and also for securing the spacers and dissipator plates in fixed position about said sleeve.

* * * * *